United States Patent Office 3,410,861
Patented Nov. 12, 1968

3,410,861
PRODUCTION OF BETA-(2- OR 4-PYRIDYL ALKYL)-AMINES
Chester M. McCloskey, Azusa, Calif., assignor to Unimed, Inc., Morristown, N.J.
No Drawing. Filed Aug. 17, 1965, Ser. No. 480,489
4 Claims. (Cl. 260—296)

ABSTRACT OF THE DISCLOSURE

The present invention relates to a commercially practical method of producing beta-(2- or 4-pyridyl alkyl)-amines in high yield by reaction of a lower alkyl primary amine acid addition salt with vinylpyridine in aqueous medium.

---

Beta-(2- or 4-pyridyl alkyl)-amines have recently been found to be extremely valuable products, finding use in the treatment of vascular headache, Ménière's syndrome, and for other purposes. Such uses of the compounds are, for example, set forth in U.S. Patent No. 3,149,034.

It is an object of this invention to provide an approved method of producing these compounds in high yield.

It is another object of this invention to provide a method which results in the direct production of these compounds in high yield and in an easily recoverable form.

Other objects and advantages of this invention will be apparent from further reading of the specification and of the appended claims.

With the above and other objects in view, the present invention mainly comprises reacting a 2- or 4-vinylpyridine with an alkyl amine in the presence of an acid catalyst, the reaction preferably being carried out in such manner that the acid catalyst is present in the form of an acid addition salt of the alkyl amine. The process of this invention permits the carrying out of the reaction in aqueous solution and a direct recovery of the reaction product.

It has been found that if the acid catalyst, for example hydrogen chloride, is present in anhydrous form, the yield of the desired final product is extremely low, and in fact, the process cannot be used on any sort of commercial scale. However, according to the present invention, the acid catalyst is present by reacting the alkyl amine with the selected acid so as to form the acid addition salt thereof, and this acid addition salt of the alkyl amine is then reacted with the vinylpyridine in aqueous solution. This reaction gives extremely high yield of the desired final product so that the process can be easily and successfully carried out on a commercial scale.

The reaction is illustrated in the following equation in which 2-vinylpyridine is reacted with methylamine hydrochloride to eventually produce the dihydrochloride of 2-pyridyl methylamine, which is also known as 2-(2'-(N-methylamino)ethyl pyridine dihydrochloride:

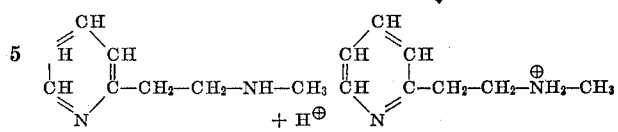

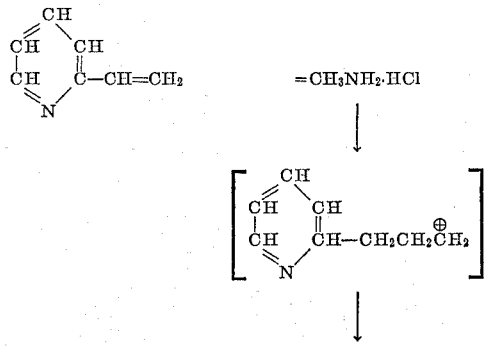

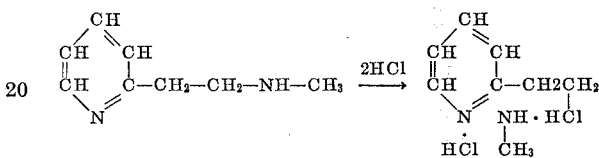

The amino pyridine is then distilled and the dihydrochloride salt is made by introducing hydrogen chloride to a solution of amino pyridine and isopropanol. The product as dihydrochloride is insoluble in isopropanol, but the monohydrochloride is soluble in isopropanol. Thus, with the induction of two molar equivalents of hydrogen chloride into the solution, one gets the dihydrochloride precipitating. The equation for this step is:

The following example illustrates the manufacturing procedure. The invention is of course not meant to be limited to the specific details of this example:

Example 15 pounds of vinyl pyridine and 13¾ pounds of methylamine hydrochloride solution (prepared by neutralizing conc. hydrochloric acid with gaseous methylamine) were added portionwise to 4 liters of refluxing isopropyl alcohol into 22 liter flask over a 2 hour period. The mixture was refluxed for an additional 2 hours. The isopropyl alcohol was distilled off until the distillation temperatures reached 100° C. After cooling to room temperature, the reaction mixture was stirred with 12 liters of chloroform and 4 liters of water. Chloroform layer was separated and the aqueous fraction extracted twice more with 2 liters each of chloroform. To the aqueous layer was added 14½ pounds of 50% sodium hydroxide solution. The mixture was chilled and extracted with 10 liters of chloroform. The aqueous layer was separated and re-extracted with two 1 liter portions of chloroform. The chloroform extracts were combined, concentrated by distillation of atmospheric pressure until the pot temperature reached 100° C. It was then concentrated under water pump vacuum until the pot temperature reached 150° C.

The residue was then distilled in 800 cc. portions in a 1 liter Claison distillation flask at 6 mm. vacuum (78° to 89°) temperature, the distillation temperature being dependent on the rate. A small or negligible amount of vinyl pyridine distills over before the main run. There is left in the flask a considerable residue. Once the main fraction has distilled, the product cannot be completely removed from residue, since continued distillation at higher temperature produced vinyl pyridine which polymerizes on contact with hydrochloric acid. Yield of aminopyridine base is 9.1 pounds. The dihydrochloride is prepared by dissolving 456 grams of 2-(2'-(N-methylamino) ethylpyridine in 4 liters of isopropyl alcohol in a 12 liter flask emersed in an ice bath. Hydrogen chloride prepared from concentrated hydrochloric acid and concentrated sulphuric acid was introduced through a polyethylene tube with stirring. After 120 grams (1 mol of hydrochloride had been added, no crystals had formed, but by the time 244 grams (2 mol of hydrochloride had been added, the flask was filled with a mass of crystals. The crystals were separated on a vacuum oven. Yield of dihydrochloride is 563 grams.

As can be noted by studying the possibilities present to the molecules in the reaction flask a further molecule of 2-vinylpyridine may react with the primary product of the reaction once the secondary amine is formed. The equation for this would be:

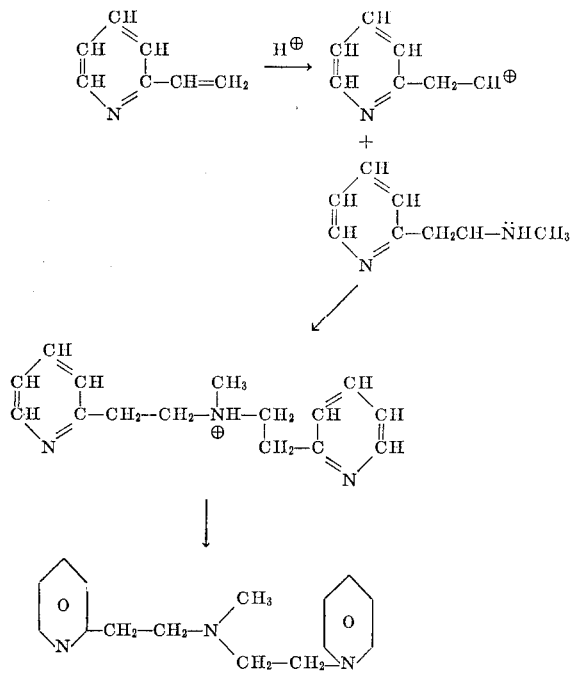

It is this tertiary amine plus polymerization product of 2-vinylpyridine which compose the residue in the distillation. 2-vinylpyridine is a molecule which is exceptionally susceptible to polymerization. The material polymerizes to a small extent during storage even when elaborate precautions such as the addition of polymerization inhibitors are employed. Acid such as hydrochloric acid, is an ideal catalyst, especially in the vapor phase of 2-vinylpyridine to produce polymerization. As acid is also employed as a catalyst in the reaction to produce the desired product, it is not surprising that some 2-vinylpyridine polymer is formed. Judicious choice of reaction conditions, solvents and time for reaction has minimized the amount of polymer formed.

There is very little, if any, vinylpyridine in the still pot prior to distillation. The vinylpyridine present during distillation is formed by the high temperature decomposition of the base into the methyl amine and vinylpyridine. Therefore, there is no need for polymerization inhibitors.

While the invention has been described in particular with respect to the production of certain 2- or 4-pyridyl alkyl amines, it is to be understood that variations and modifications thereof can be made without departing from the spirit or scope of the invention. Accordingly, such variations and modifications are meant to be comprehended within the meaning and scope of equivalence of the appended claims.

What is claimed as new and desired to be secured by Letters Patent is:

1. The method of producing a pyridyl alkyl amine selected from the group consisting of beta-(2-pyridyl alkyl)-amines and beta-(4-pyridyl alkyl)-amines, which comprises reacting a compound selected from the group consisting of 2-vinylpyridine and 4-vinylpyridine with an alkyl primary amine acid addition salt in aqueous medium, thereby forming a reaction mixture including the corresponding pyridyl alkyl amine in aqueous solution, extracting the reaction mixture, separating the aqueous phase, and recovering the pyridyl alkyl amine from the separated aqueous phase.

2. Method according to claim 1 in which said acid addition salt is the hydrochloride.

3. Method according to claim 2 in which the extraction is carried out with chloroform.

4. Method according to claim 1 in which said lower alkyl primary amine is methylamine.

References Cited

UNITED STATES PATENTS 2,792,403   5/1957   Blicke _____ 260—296

OTHER REFERENCES

Reich et al., J. Am. Chem. Soc., vol. 77, pp. 4913–15 (1955) QD1.A5.

HENRY R. JILES, *Primary Examiner.*

A. ROTMAN, *Assistant Examiner.*